Jan. 20, 1959  J. F. JOHNSTON  2,869,808
VANE STABILIZING WING TIP POD FOR AIRCRAFT
Filed Aug. 22, 1955  2 Sheets-Sheet 1
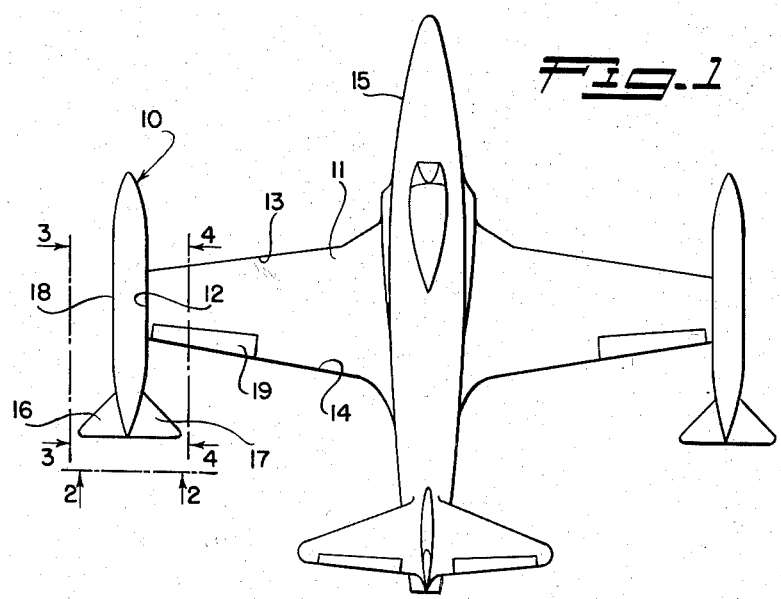
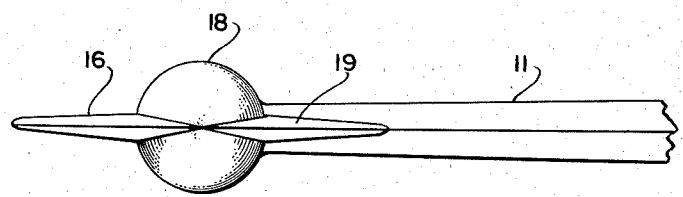
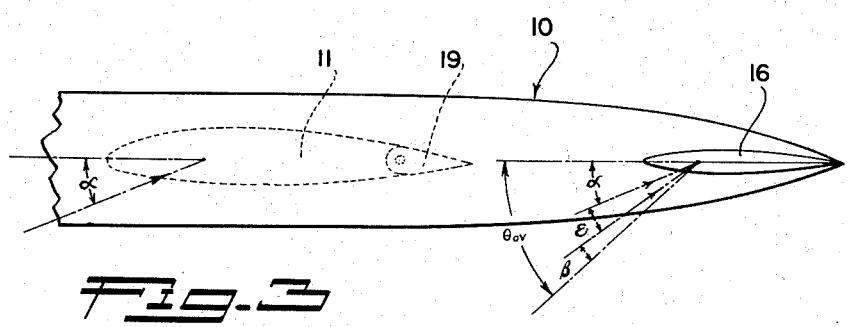
INVENTOR.
J. FORD JOHNSTON
BY
Agent

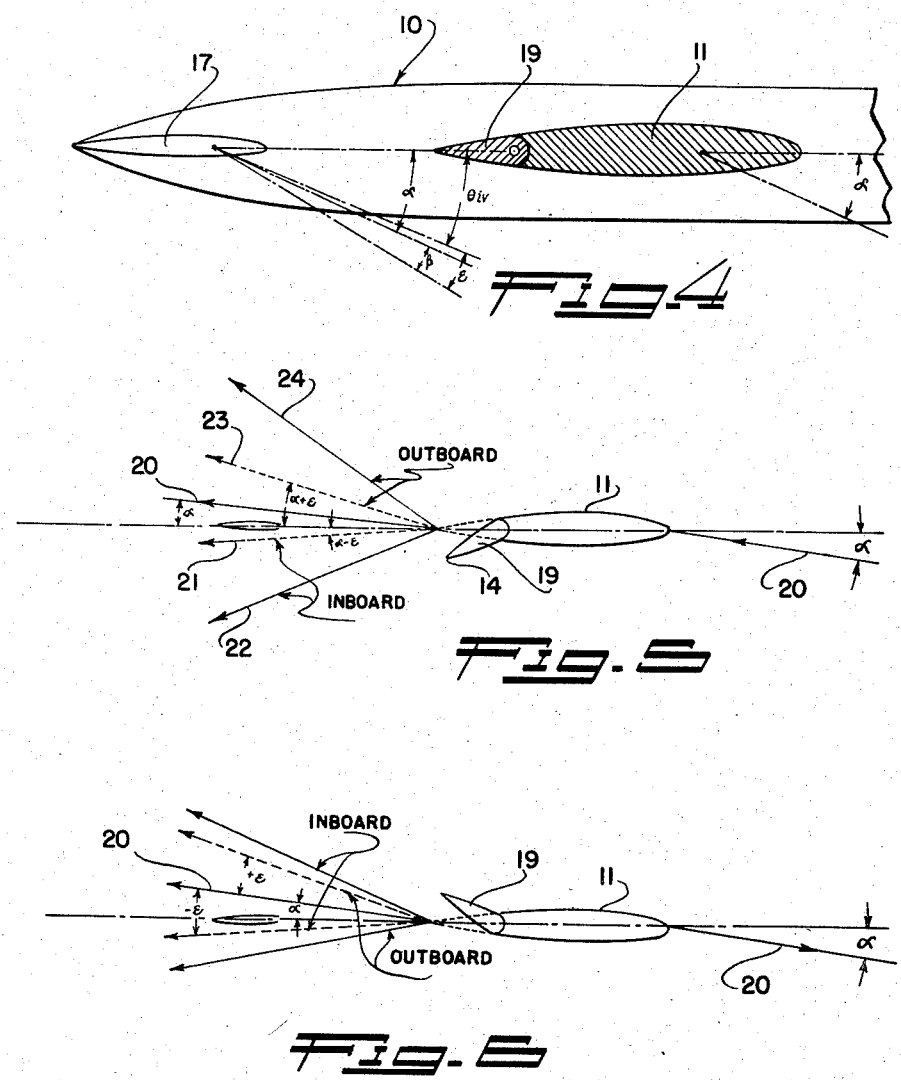

United States Patent Office 2,869,808
Patented Jan. 20, 1959

2,869,808

VANE STABILIZING WING TIP POD FOR AIRCRAFT

J. Ford Johnston, Burbank, Calif., assignor to Lockheed Aircraft Corporation, Burbank, Calif.

Application August 22, 1955, Serial No. 529,614

3 Claims. (Cl. 244—135)

This invention relates generally to aircraft and more particularly to a vane stabilized wing tip tank for carrying fuel, equipment or the like on an airplane.

The use of stores containers or tanks on the wing tips of aircraft has become widely accepted as an efficient device for meeting the space requirements for fuel storage, etc., especially in the smaller, high performance type aircraft. While the effect of such installations on the over-all stability of aircraft is known to be undesirable using conventional tank configurations, the reduction in wing bending loads obtained under normal flight conditions with tip tanks is an attractive inducement for their use. In the majority of subsonic airframe wing designs the de-stabilizing effect of wing tip tanks is tolerable. This is not true however, in some high subsonic and many transonic and supersonic airframe wing designs, particularly where a short span wing is employed having a natural vibration frequency in torsion less than that in bending when the tip tank is installed. A tip tank on such a high speed wing may create de-stabilizing forces of sufficient magnitude to render the aircraft uncontrollable or in some severe cases to actually tear the wing apart. This de-stabilizing effect is particularly noticeable with large tip tanks having a high ratio of length to diameter.

It is an object of this invention to provide a wing tip tank with a pair of aerodynamic stabilizing vanes secured to the aft end thereof and aligned generally parallel with the plane of the wing to define an inboard and an outboard vane which both statically and dynamically stabilizes the tip tank and materially reduces wing twisting moments due to aileron deflection.

Another object of this invention is to provide vane arrangement on a wing tip tank for stabilizing the wing against flutter by providing damping moments when the wing twists cyclically about a spanwise axis.

Still another object of this invention is to provide an aerodynamic stabilizing vane configuration which will allow the use of large size wing tip tanks for the storage of fuel or the like without adversely affecting the over-all stability of the aircraft to which it is attached.

Further and other objects will become apparent from a reading of the following description especially when considered in combination with the accompanying drawing wherein like numerals refer to like parts.

Figure 1 is a top plan view of an aircraft employing the vane stabilized wing tip tank of this invention;

Figure 2 is an end view of the wing tip tank installation shown in Figure 1, looking forward;

Figure 3 is a sectional view taken on line 3—3 of Figure 1;

Figure 4 is a sectional view taken on line 4—4 of Figure 1; and

Figures 5 and 6 are views showing schematically the wing and vane arrangement and the influence on the airstream aft of the wing trailing edge both inboard and outboard of the wing tip due to aileron deflection.

Referring to Figures 1 and 2, tip tank 10 is suitably secured to wing 11 at the tip end 12 thereof so that its longitudinal axis is generally parallel with the plane of the wing and aligned with the direction of flight. Tank 10 extends forwardly of leading edge 13 and aft of trailing edge 14 of wing 11 substantially equal amounts to provide static balance. The over-all length and diameter of tank 10 may vary depending upon the volumetric storage requirements of a given design.

The basic container structure 18 of tank 10 is streamlined in shape for minimum drag. Without vanes or other stabilizing means it is an unstable body; that is, it will tumble when moved through the air unless restrained such as by securing the same to aircraft 15. By attaching the tank to the aircraft, the de-stabilizing forces produced by the tank are transmitted into the aircraft structure decreasing its over-all stability. If the de-stabilizing forces of the tank are of sufficient magnitude, the aircraft will become unstable directly as a result of the forces themselves or through distortion of the wing to which the tank is attached. At low subsonic speeds these de-stabilizing forces produced by wing tip tanks are generally sufficiently small that there is little, if any, noticeable difference in the handling characteristics of the aircraft; however, as the speed of flight is increased the effect of the conventional unstabilized tip tanks becomes more noticeable and in many high speed airframe designs, unstabilized tip tanks may actually cause destruction of the aircraft from vibration and wing distortion.

The problem of stabilizing an isolated aerodynamic body is normally rather easily accomplished from a knowledge of the prior art but where the body such as a tip tank is carried by the wing of an airplane the problem becomes infinitely more difficult due to the complex nature of the airflow near the tip section of the wing. The application of conventional design theory does not provide a solution. In fact, following generally accepted theories about airflow around a wing tip one would conclude that both static and dynamic stabilization for a tip tank could not be obtained with vanes due to the time lag in the stabilizing forces involved. Test results indicate however, that the arrangement of this invention as hereinafter described does effectively provide both dynamic and static stability for a tip tank under all flight conditions.

As shown in Figure 1 a pair of vanes 16 and 17 are provided on the basic container structure 18 of tank 10 at the extreme aft end thereof behind trailing edge 14 of wing 11. Vane 16 is referred to herein as the outboard vane and vane 17 is referred to herein as the inboard vane to clearly distinguish one from the other in this discussion since each performs a different function in stabilizing the tank. It should be pointed out here that while inboard and outboard fins are considered to perform individual functions, in the final analysis they are combined to provide the necessary dynamic and static stability for the tip tank. Both outboard and inboard fins 16 and 17 respectively, as best shown in Figure 2, are generally coplanar with respect to each other and with respect to wing 11. While the vanes are shown in the drawing as being delta shaped in plan form, any plan form shape would be suitable and still obtain the full benefits of this invention so long as the span of inboard vane 17 is sufficient to have a substantial portion thereof located directly aft of aileron 19 on wing 11.

Vanes 16 and 17 are airfoil shaped in cross section as shown in Figures 3 and 4 to serve as lifting surfaces for stabilization. The outboard vane 16 as shown in Figure 3 as well as the inboard vane shown in Figure 4 are affected by the air flow off wing 11 as well as the air flow around tank 10 forwardly of the vanes.

The change in the free stream direction of air flow as it passes over wing 11 is schematically shown in Figure 5. Assuming the wing is at an angle of attack, $\alpha$, relative to the direction of the free stream air as indicated by arrow 20, the air flow immediately behind the wing and inboard of the tip will be directed downwardly with respect to its initial direction $\alpha$ as indicated by arrow 21 whereas the tip vortex air flow outboard of the tip of the wing and in the vicinity of outboard vane 16 will be deflected upwardly with respect to its initial direction $\alpha$ as indicated by arrow 23.

The magnitude of the direction change $\epsilon$ of the free stream air as it passes over wing 11 is also affected by the angular positioning of aileron 19. With the aileron in the neutral position as indicated by dotted lines in Figure 5 the deflection, $\epsilon$, of the free stream air is small as indicated by arrows 21 and 23. However, when the aileron is deflected downwardly as indicated by solid lines in Figure 5, the deflection of the free stream air becomes greater as indicated by arrows 22 and 24. On the other hand, when the aileron is deflected upwardly as shown in Figure 6 the change in the direction of air flow aft of the wing relative to the free stream air changes in a reverse sense, that is, the air flow aft of the wing and outboard of the tip tends to be deflected downwardly with respect to its initial direction $\alpha$ while the air flow inboard of the tip tends to be deflected upwardly with respect to its initial direction $\alpha$.

This change which occurs in the direction of air flow in the wake of the wing makes stabilization of the combination wing and tip tank a somewhat unique problem due to the wing twisting moments which are developed.

To both statically and dynamically stabilize a body in motion such as tank 10 in a fluid medium such as air, the vanes must always urge the longitudinal axis of the body to remain substantially parallel with the direction of relative motion. If there is a lag in a statically stabilizing force on the body, the effect of this lag will be dynamically de-stabilizing and vice versa.

Referring again to Figure 3 and outboard vane 16 on tip tank 10, it is shown the angle of attack $\theta_{ov}$ of the outboard vane is a function of the angle of attack, $\alpha$, of wing 11, a function of the change, $\epsilon$, in the direction of the free stream air due to its passing over the wing and a function of the cross flow $\beta$ around tank 10 due to its having an angle of attack relative to the free stream air. All $\theta_{ov}$ components, $\alpha$, $\epsilon$ and $\beta$ are positive at the spanwise position of the outboard vane, that is, they will all add numerically to provide the angle of attack for vane 16.

Since the angle of attack $\theta_{ov}$ controls the lift force produced by the vane and since any increase in the angle of attack $\alpha$ of the aircraft will result in increasing all three functions, $\alpha$, $\epsilon$ and $\beta$ and vice versa when the angle of attack is decreased, tip tank 10 may be statically stabilized by vane 16 for all angles of attack.

The change in the angle of attack component identified as $\epsilon$, is due to circulation around the wing tip which produces a downwash inboard of the tip and an upwash outboard of the tip. The finite distance from the wing to the vane introduces a lag in the $\epsilon$ component so that it will not change instantaneously with the change in $\alpha$ but will be delayed. This delay in the $\epsilon$ function makes the outboard vane dynamically de-stabilizing and under conditions where the natural vibration frequency of wing 11 in torsion is less than that in bending as is the case in many high speed aircraft wing designs, this instability is extremely harmful. The vibrations introduced by dynamic instability can be much more dangerous than the stresses imposed on the wing by static instability.

The dynamic de-stabilizing action of outboard vane 16 is counteracted in accordance with this invention by the use of an inboard vane 17. The angle of attack $\theta_{iv}$ of inboard vane 17 varies with the angle of attack $\alpha$ of main wing 11, with the effective cross flow angle $\beta$ and with the deflection angle $\epsilon$ which, inboard of the tip end of wing 11, is opposite in sense to either $\alpha$ or $\beta$. This negative component $\epsilon$ therefore tends to make the inboard vane statically de-stabilizing; however, outboard vane 16 acts to counteract this static instability and provide a net positive static stabilizing force for the tip tank.

While inboard vane 17 may be statically de-stabilizing under certain conditions as pointed out hereinabove it serves to counteract the dynamic instability of outboard vane 16. The negative component of the angle of attack $\theta_{iv}$ of inboard vane 17 is derived by the free stream air passing over wing 11. It will therefore exhibit a finite time lag at vane 17 since this air which leaves the trailing edge of wing 11 must travel aft to vane 17. This lag effectively makes the vane dynamically stabilizing inasmuch as the $\epsilon$ component is statically de-stabilizing. This dynamic stability obtained with inboard vane 17 serves to counteract the dynamic instability of outboard vane 16. Thus the two vanes in cooperation with each other provide sufficient dynamic and static stability for the wing and tip tank to avoid diminishing the over-all stability of the aircraft to which the tank is attached.

Inboard vane 17, in addition to cooperating with outboard vane 16 to provide both static and dynamic stability for the wing and tip bank is effective to reduce wing twisting moments produced by aileron deflection. The change in the $\epsilon$ component of the airstream acting on outboard vane 16 as caused by deflecting aileron 19 operates to increase still more the wing twisting moments produced directly by the aileron. This is obviously an undesirable characteristic of the outboard vane, however it is not serious when both the outboard and inboard vanes are employed, since the latter will effectively counteract the increased wing twisting moments produced by the outboard vane. When aileron 19 is deflected in either direction from the neutral position the forces tending to produce twist in the wing change the component of the airstream acting on inboard vane 17 as shown in Figures 5 and 6 to produce a force by airfoil action which is in the opposite direction to that produced by the aileron and outboard vane.

Since the moment arm of vane 17 is greater than the moment arm of aileron 19 about the elastic axis of wing 11, by eliminating the outboard vane or reducing its size the twisting moments of the aileron per se may be substantially reduced while maintaining a large difference in the net change in lift needed for roll control of the aircraft. This elimination or reduction in size of the outboard vane may therefore be a desirable modification where a reduction in wing twisting moments is a primary consideration.

The operation of the vanes on the wing tip tank to provide both dynamic and static stabilization thereof as well as to reduce the wing twisting moments due to aileron deflection is believed obvious from a reading of the foregoing description. The outboard vane provides static stability and the inboard vane provides dynamic stability for the wing and tank. In addition, the inboard vane serves to counteract the wing twisting moments by the aileron and outboard vane.

While vanes 16 and 17 are preferably arranged at the same angle of incidence with respect to the longitudinal axis of the aircraft fuselage as is wing 11, their incidence angles may be made different without departing from the teachings of this invention. For example, in order to eliminate the tendency of tank 10 to rotate due to the $\epsilon$ component of the angle of attack of the vanes, the incidence angle thereof relative to the longitudinal axis of the tank may be shifted to eliminate this component for a predetermined flight condition, though of course not for all conditions since the $\epsilon$ component varies with changes in angle of attack and aileron position. This shift in the incidence angle may be desirable in certain cases where the wing to which the tank is attached can not, under a particular flight condition, safely resist the forces tending to roll the tank.

It should be understood that certain alterations, modifications and substitutions such as those mentioned hereinabove may be made to the instant disclosure without departing from the spirit and scope of this invention as defined by the appended claims.

I claim:

1. In an aircraft having a wing and an aileron swingably carried adjacent the outboard trailing edge thereof, a streamlined tank secured to the tip of the wing, said tank being aligned with the direction of flight for minimum drag and having the ends thereof extending beyond the leading and trailing edges of the wing, a pair of airfoil shaped vanes secured to the aft end of said tank in a substantially coplanar relationship with respect to each other and generally parallel with the plane of the wing, one of said vanes projecting inboard from the wing tip and having a substantial portion thereof directly aft of the aileron and in the wake of the wing, the other of said vanes projecting outboard from the wing tip and in the wake of the tip vortex whereby the pair of vanes cooperate aerodynamically to always provide both static and dynamic stabilizing forces for the wing and tank.

2. In an aircraft having a wing and an aileron swingably carried adjacent the outboard trailing edge of the wing, a streamlined tip tank secured to the tip of the wing and having the ends thereof projecting beyond the leading and trailing edges to provide static balance, said tank including an airfoil shaped vane fixedly secured to the aft end thereof, said vane forming its own leading and trailing edges and projecting inboard from said wing tip in a plane generally parallel with the wing and having a substantial portion thereof directly aft of the aileron to dynamically stabilize the wing and tank and reduce wing twisting moments introduced by aileron deflection.

3. In an aircraft having a wing which exhibits a natural vibration frequency in torsion less than that in bending, a tip tank comprising, a streamlined body secured to the wing tip and having the aft end thereof projecting rearwardly beyond the trailing edge of the wing, and a vane forming its own leading and trailing edges and being fixedly secured to the aft end of said streamlined body and projecting inboard from the wing tip in a plane generally parallel with the plane of the wing to receive air directly from the wing and inherently provide dynamically stabilizing forces for the wing and tip tank.

References Cited in the file of this patent

UNITED STATES PATENTS

| 1,897,756 | Hahn | Feb. 14, 1933 |
| 2,326,819 | Berlin | Aug. 17, 1943 |
| 2,417,342 | Bach | Mar. 11, 1947 |

FOREIGN PATENTS

| 872,789 | France | Feb. 23, 1942 |

OTHER REFERENCES

"Aero Digest," April 1951, page 23.